(12) United States Patent
Yang

(10) Patent No.: US 10,890,808 B2
(45) Date of Patent: Jan. 12, 2021

(54) CELL ASSEMBLY, DISPLAY PANEL AND DISPLAY DEVICE

(71) Applicants: HKC CORPORATION LIMITED, Guangdong (CN); CHONGQING HKC OPTOELECTRONICS TECHNOLOGY CO., LTD., Chongqing (CN)

(72) Inventor: Yanna Yang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/312,601

(22) PCT Filed: Nov. 21, 2018

(86) PCT No.: PCT/CN2018/116679
§ 371 (c)(1),
(2) Date: Dec. 21, 2018

(87) PCT Pub. No.: WO2020/062510
PCT Pub. Date: Apr. 2, 2020

(65) Prior Publication Data
US 2020/0103715 A1 Apr. 2, 2020

(30) Foreign Application Priority Data
Sep. 30, 2018 (CN) ............... 2018 2 1622467 U

(51) Int. Cl.
*G02F 1/1339* (2006.01)
*G02F 1/1362* (2006.01)

(52) U.S. Cl.
CPC ...... *G02F 1/1339* (2013.01); *G02F 1/136209* (2013.01); *G02F 2001/136222* (2013.01); *G02F 2201/121* (2013.01)

(58) Field of Classification Search
CPC ............. G02F 1/136209; G02F 1/1339; G02F 2001/136222; G02F 2201/121;
(Continued)

(56) References Cited

U.S. PATENT DOCUMENTS

2007/0058125 A1* 3/2007 Yoo .................... G02F 1/133516
349/152
2011/0090445 A1* 4/2011 Kim ...................... G02F 1/1339
349/139

(Continued)

*Primary Examiner* — Shan Liu

(57) ABSTRACT

A cell assembly, including a first substrate and a second substrate. The first substrate includes: a color resist layer and a first passivation layer. The first support protrudes from the color resist layer. The first passivation layer covers the color resist layer. The first passivation layer and the first support together form a first support assembly, and the first support assembly is in surface contact with the second substrate. Compared with the use of the silicon ball and the gold ball independent of the first substrate to support the second substrate, the present construction is much stable and has better support effect, thereby realizing the uniform thickness of the peripheral region of the cell.

12 Claims, 2 Drawing Sheets

(58) Field of Classification Search
CPC ......... G02F 1/133514; G02F 1/133512; G02F 1/13473; G02F 1/133371; G02F 2001/136218; G02F 1/0107; G02F 1/13392; G02F 1/13394; G02F 1/161; G02F 1/133377; G02F 1/133707; G02F 2001/13396; G02F 2001/13398; H01J 11/44; H01J 2211/444; H01J 2329/323; H01J 29/327; H01L 27/3246
USPC .................................. 349/106–111, 155–157
See application file for complete search history.

(56) References Cited

U.S. PATENT DOCUMENTS

| | | | |
|---|---|---|---|
| 2012/0242939 A1* | 9/2012 | Li | G02F 1/13394 |
| | | | 349/106 |
| 2013/0214299 A1* | 8/2013 | Ryu | H01L 27/1225 |
| | | | 257/88 |
| 2014/0022478 A1* | 1/2014 | Kim | G02F 1/1339 |
| | | | 349/43 |
| 2014/0092357 A1* | 4/2014 | Chen | G02F 1/1333 |
| | | | 349/155 |
| 2016/0011445 A1* | 1/2016 | Chen | G02F 1/1337 |
| | | | 349/110 |
| 2017/0146834 A1* | 5/2017 | Tak | G02F 1/1339 |
| 2017/0160574 A1* | 6/2017 | Yamaguchi | G02F 1/13338 |
| 2017/0285390 A1* | 10/2017 | Mun | G02F 1/133345 |

* cited by examiner

CELL ASSEMBLY, DISPLAY PANEL AND DISPLAY DEVICE

CROSS-REFERENCE TO RELATED APPLICATIONS

This application is the International Application No. PCT/CN2018/116679 for entry into US national phase with an international filing date of Nov. 21, 2018, designating US, now pending, and claims priority to Chinese Patent Application No. 201821622467.X, filed on Sep. 30, 2018, the content of which is incorporated herein by reference in its entirety.

BACKGROUND OF THE INVENTION

Field of the Invention

The present application relates to the technical filed of display devices, and more particularly to a cell structure, a display panel, and a display device.

Description of Related Art

Display devices, such as mobile phones, personal digital assistants, digital cameras, desktop computers, or notebook computers, have been widely used due to their numerous advantages such as thin body, power saving, and radiation free. In the field of display device manufacturing, a cell process is a process where a color film substrate and an array substrate are attached and bonded by a sealant, and at the same time, the liquid crystal is injected into a gap between two glass substrates, and the thickness of the gap is controlled.

At present, in order to make the attached color film substrate and the array substrate have a uniform thickness and make the color film substrate in electric connection with the array substrate, a certain proportion of silicon balls and golden balls are generally incorporated in the peripheral region of the sealant. The silicon ball plays a role in supporting the thickness of the peripheral region in the cell assembly, and the gold ball is configured to electrically connect the color film substrate with the array substrate. However, since the contact area of the respective silicon ball and gold ball with the color film substrate or the array substrate is small, the control of the thickness of the peripheral region is extremely unstable, resulting in ununiformity of the thickness of the peripheral region of the display panel and affecting the display of the display panel.

BRIEF SUMMARY OF THE INVENTION

It is an object of the present application to provide a cell assembly, for the purpose of, comprising but not limited to, realizing the uniform thickness of a peripheral region of the cell in the display penal.

The present application adopts the following technical solutions:—a cell assembly is provided and comprise:
a first substrate; and
a second substrate, arranged opposite to and spaced apart from the first substrate.
The first substrate comprises:
a color resist layer, provided with the first support protruding therefrom; and
a first passivation layer, covering the color resist layer, where the first passivation layer and the first support together form a first support assembly, and the first support assembly is in surface contact with the second substrate.

In some embodiments, the cell assembly further comprises:
a sealant, filled in a gap between the first substrate and the second substrate.
The first support assembly is arranged within a coating area of the sealant.

In some embodiments, the sealant is applied to edges of the first substrate and the second substrate along a circumference direction, In some embodiments, a surface of the first support assembly is covered with a first conductive layer.

In some embodiments, the first substrate further comprises:
a first substrate layer;
a metal wire, arranged on a surface of the first substrate layer;
an insulation layer, arranged on a surface of the metal wire and a surface of the first substrate layer exposed out of the metal wire; and
a second passivation layer, arranged on a surface of the insulation layer and configured for connecting the color resist layer;
the first substrate defines therein a contact hole; the contact hole is arranged within the coating area of the sealant; the contact hole passes through the first passivation layer, the color resist layer, the insulation layer, and the second passivation layer and is configured to allow the first conductive layer to pass therethrough into electrical connection with the metal wire.

In some embodiments, a second support further protrudes from the color resist layer; the second support is located in the contact hole; the second support and the first passivation layer together form a second support assembly; the second support assembly is in surface contact with the second substrate; and the first conductive layer further covers the second support assembly.

In some embodiments, a surface of a side of the first support assembly close to the second substrate is located on the same level as a surface of a side of the second support assembly close to the second substrate.

In some embodiments, an outer contour of the first support and an outer contour of the second support are post-like.

In some embodiments, the first support, the second support, and the color resist layer are formed as a whole.

In some embodiments, the color resist layer comprises a red color block, a blue color block, and a green color block.

In some embodiments, the respective first support and second support and one of the red color block, the blue color block, and the green color block are formed as a whole.

In some embodiments, the respective first support and second support is formed by stacking the red color block, the blue color block, and the green color block.

In some embodiments, the second substrate comprises:
a second substrate layer; and
a second conductive layer, arranged at the second substrate layer and connected to the metal wire via the first conductive layer.

In some embodiments, the second substrate further comprises:
a black shading layer, sandwiched between the second substrate layer and the second conductive layer and configured to block the light from a light leakage area.

In some embodiments, the first conductive layer and the second conductive layer are films made of indium tin oxide.

In the cell assembly provided by the present application, the first support is arranged on the color resist layer, the first support and the first passivation layer covering a surface of the first support together form the first support assembly, the second substrate is supported by the first substrate via the first support assembly, and the first support assembly is in surface contact with the second substrate. Compared with the use of the silicon ball and the gold ball independent of the first substrate to support the second substrate, the present construction is much stable and has better support effect, which can more accurately control the thickness of the cell at a periphery thereof, such that technical problem of ununiformity of the thickness of the cell at the periphery is effectively tackled, and the yield of the display panel is improved.

It is another object of the present application to provide a display panel comprising a cell assembly. The cell assembly comprises:

a first substrate; and a second substrate, arranged opposite to and spaced apart from the first substrate; and a sealant, filled in a gap between the first substrate and the second substrate;

the first substrate comprises:

a first substrate layer;

a metal wire, arranged on a surface of the first substrate layer;

an insulation layer, arranged on a surface of the metal wire and a surface of the first substrate layer exposed out of the metal wire; and a second passivation layer, arranged on a surface of the insulation layer;

a color resist layer, arranged on the second passivation layer, where the first support and the second support protrude from the color resist layer; and a first passivation layer, covering the color resist layer, where the first passivation layer and the first support together form a first support assembly, the second passivation layer and the second support together form a second support assembly, and the first support assembly and the second support assembly are in surface contact with the second substrate; and a first conductive layer, covering the first support assembly and the second support assembly.

The first substrate defines therein a contact hole. The contact hole is arranged within the coating area of the sealant. The contact hole passes through the first passivation layer, the color resist layer, the insulation layer, and the second passivation layer and is configured to allow the first conductive layer to pass therethrough into electrical connection with the metal wire. The first support is arranged at an edge outside the contact hole, and the second support is arranged inside the contact hole.

In some embodiments, the first substrate is an array substrate provided with a color film, and the second substrate is a substrate provided with a common electrode.

The display panel provided by the present application adopts the cell assembly. The first support is arranged on the color resist layer, the first support and the first passivation layer covering the surface of the first support together form the first support assembly, the second substrate is supported by the first substrate via the first support assembly, and the first support assembly is in surface contact with the second substrate. Compared with the use of the silicon ball and the gold ball independent of the first substrate to support the second substrate, the present construction is much stable and has better support effect, which can more accurately control the thickness of the peripheral region of the cell, such that technical problem of ununiformity of the thickness of the cell at the periphery is effectively tackled, and the yield of the display panel is improved.

It is still another object of the present application to provide a display device. The display device comprises:

a display panel, and a backlight assembly, configured to illuminate the display panel.

The display panel comprises a cell assembly, and the cell assembly comprises:

a first substrate; and a second substrate, arranged opposite to and spaced apart from the first substrate.

The first substrate comprises:

a color resist layer, provided with the first support protruding therefrom; and a first passivation layer, covering the color resist layer, where the first passivation layer and the first support together form a first support assembly, and the first support assembly is in surface contact with the second substrate.

The display panel provided by the present application adopts the display panel. The first support is arranged on the color resist layer, the first support and the first passivation layer covering the surface of the first support together form the first support assembly, the second substrate is supported by the first substrate via the first support assembly, and the first support assembly is in surface contact with the second substrate. Compared with the use of the silicon ball and the gold ball independent of the first substrate to support the second substrate, the present construction is much stable and has better support effect, which can more accurately control the thickness of the peripheral region of the cell, such that technical problem of ununiformity of the thickness of the cell at the periphery is effectively tackled, and the yield of the display panel is improved, and the production cost of the display device is reduced.

BRIEF DESCRIPTION OF THE DRAWINGS

In order to more clearly illustrate the technical solution in embodiments of the present application, the following drawings, which are to be used in the description of the embodiments or the existing techniques, will be briefly described. It will be apparent that the drawings described in the following description are merely embodiments of the present application. Other drawings may be obtained by those skilled in the art without paying creative labor.

Figure 1:
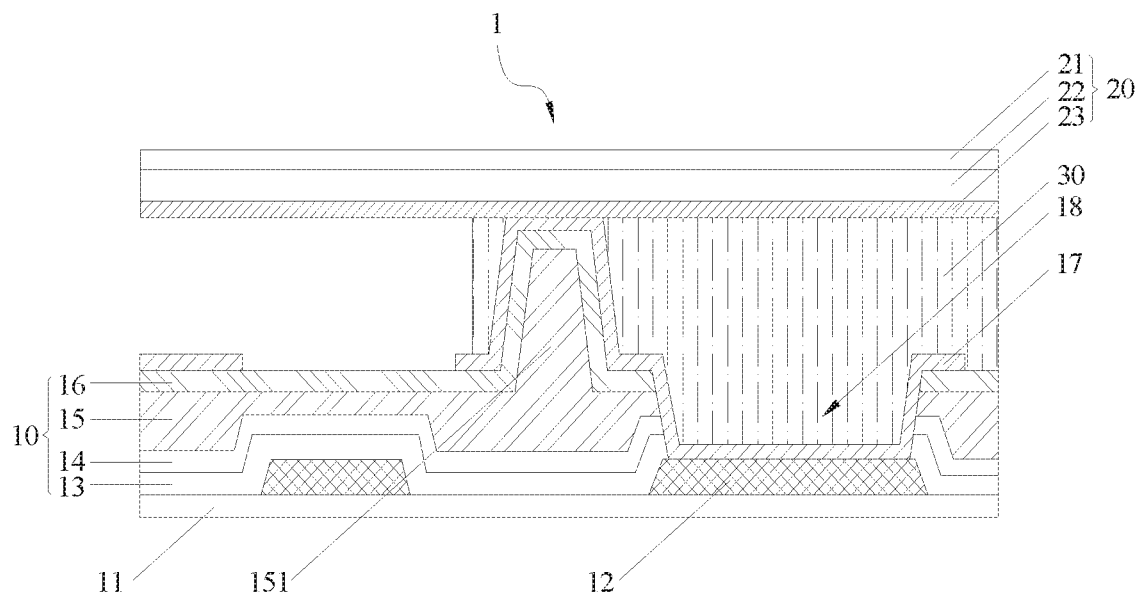
FIG. 1 is a schematic view of a cell assembly of a display panel provide by some embodiments of the present application.

In the drawings, the following reference numerals are adopted:

1. Display panel; 2. Backlight assembly; 10. First substrate; 20. Second substrate; 30. Sealant; 11. First substrate layer; 12. Metal wire; 13. Insulation layer; 14. Second passivation layer; 15. Color resist layer; 16. First passivation layer; 17. First conductive layer; 18. Contact hole; 21. Second substrate layer; 22. Black shading layer; 23. Second conductive layer; 151. First support; 152. Second support.

DETAILED DESCRIPTION OF THE EMBODIMENTS

In order to make the technical problems to be solved, technical solutions, and beneficial effects of the present application more clear, the present application will be further described in detail hereinbelow with reference to the accompanying drawings and embodiments. It should be understood that the specific embodiments described herein are merely intended to explain the application rather than to limit the present application.

It should be noted that when an element is referred to as being "fixed" or "arranged" at/in/on another element, it can be directly at/in/on the other element. When an element is referred to as being "connected" to/with the another element, it can be directly or indirectly connected to/with the other element. It should be understood that terms "top", "bottom", "left", "right", and the like indicating orientation or positional relationship are based on the orientation or the positional relationship shown in the drawings, and are merely for facilitating the description of the present application, rather than indicating or implying that a device or component must have a particular orientation, or be configured or operated in a particular orientation, and thus should not be construed as limiting the application; and the specific meaning of the above terms can be understood by those skilled in the art according to specific circumstances. Moreover, the terms "first" and "second" are adopted for descriptive purposes only and are not to be construed as indicating or implying a relative importance or implicitly indicating the number of technical features indicated. Thus, features defining "first" and "second" may include one or more of the features either explicitly or implicitly. In the description of the present application, the meaning of "a plurality of" or "multiple" is two or more unless otherwise particularly defined.

The detailed implementations of a display panel and a display device provided by embodiments of the present application are described hereinbelow with reference to the accompanying drawings. The size and shape of a particular region in the drawings do not reflect the true proportion, and the purpose is only to illustrate the content of the present application.

Referring to FIG. 1, a cell assembly includes a first substrate 10 and a second substrate 20, in which, the second substrate 20 is arranged opposite to and spaced apart from the first substrate 10. The first substrate 10 includes a color resist layer 15 and a first passivation layer 16, particularly, the first support 151 protrudes from the color resist layer 15, the first passivation layer 16 covers the color resist layer 15, and the first passivation layer 16 and the first support 151 together form a first support assembly. The first support assembly is in surface contact with the second substrate 20, that is, an outer contour of the second substrate 20 at the abutment connection with the second substrate 20 is planar in order to support the second substrate 20. It can be understood that, herein, the first substrate 10 may be an array substrate provided with a color film, and the second substrate 20 may be a substrate provided with a common electrode.

In the cell assembly provided by the present application, the first support 151 is arranged on the color resist layer 15, the first support 151 and the first passivation layer 16 covering a surface of the first support 151 together form the first support assembly, the second substrate 20 is supported by the first substrate 10 via the first support assembly, and the first support assembly is in surface contact with the second substrate 20. Compared with the use of the silicon ball and the gold ball independent of the first substrate to support the second substrate, the present construction is much stable and has better support effect, which can more accurately control the thickness of the cell at a periphery thereof, such that technical problem of ununiformity of the thickness of the cell at the periphery is effectively tackled, and the yield of the display panel 1 is improved.

Referring to FIG. 1, in embodiments of the cell assembly provided by the present application, the cell assembly further includes a sealant 30 which is filled in a gap between the first substrate 10 and the second substrate 20 and configured for bonding the first substrate 10 with the second substrate 20. Particularly, the sealant 30 is applied to edges of the first substrate 10 and the second substrate 20 along a circumference direction, and the first support assembly is arranged within the coating area of the sealant 30. Such that the first support assembly is supported at edge regions of the first substrate 10 and the second substrate 20, thereby ensuring the uniformity of the cell thickness at the periphery of the display panel 1.

Referring to FIG. 1, in embodiments of the cell assembly provided by the present application, a surface of the first support assembly is covered with a first conductive layer 17. Particularly, the first support 151 can be formed by selecting a readily moldable resin material, such that the formed first support assembly has a small relative hardness, and the extrusion on the first passivation layer 16 is reduced. At the same time, the surface of the first support assembly is covered with a first conductive layer 17 with a uniform thickness, where the first conductive layer 17 can be selected as films made of Indium Tin Oxides (ITO), so that after the cell process, the first substrate 10 and the second substrate 20 can be conducted via the first conductive layer 17, that is, the first support assembly functions as both a silicon ball and a gold ball, which is beneficial for simplifying the manufacturing process.

Referring to FIG. 1, in embodiments of the cell assembly provided by the present application, the first substrate 10 further includes the first substrate layer 11, the metal wire 12, the insulation layer 13, and the second passivation layer 14. The first substrate layer 11 is a glass substrate. The metal wire 12 is arranged on a surface of the first substrate layer 11. The insulation layer 13 is arranged on a surface of the metal wire 12 and a surface of the first substrate layer 11 exposed out of the metal wire 12. The second passivation layer 14 is arranged on a surface of the insulation layer 13 and configured for connecting the color resist layer 15, that is, the color resist layer 15 is sandwiched between the second passivation layer 14 and the first passivation layer 16. In the meanwhile, the first substrate 10 defines therein a contact hole 18; the contact hole 18 is arranged within the coating area of the sealant 30, and the contact hole 18 passes through the first passivation layer 16, the color resist layer 15, the insulation layer 14, and the second passivation layer 13; and the contact hole 18 is configured to allow the first conductive layer 17 to pass therethrough to realize electrical connection between the first conductive layer 17 and the metal wire 12. Particularly, the metal wire 12 is configured to form a common electrode of the first substrate 10, and at least one contact hole 18 is arranged within the coating area of the sealant 30, the contact hole 18 runs through the first passivation layer 16, the color resist layer 15, the insulation layer 14, and the second passivation layer 13, such that the first conductive layer 17 can extend along the surface of the first passivation layer 16 and pass through the contact hole 18 to be electrically connected with the metal wire 12, and therefore the common electrode in the first substrate 10 can be electrically connected to a common electrode in the second substrate 20 through the first conductive layer 17.

Figure 2:
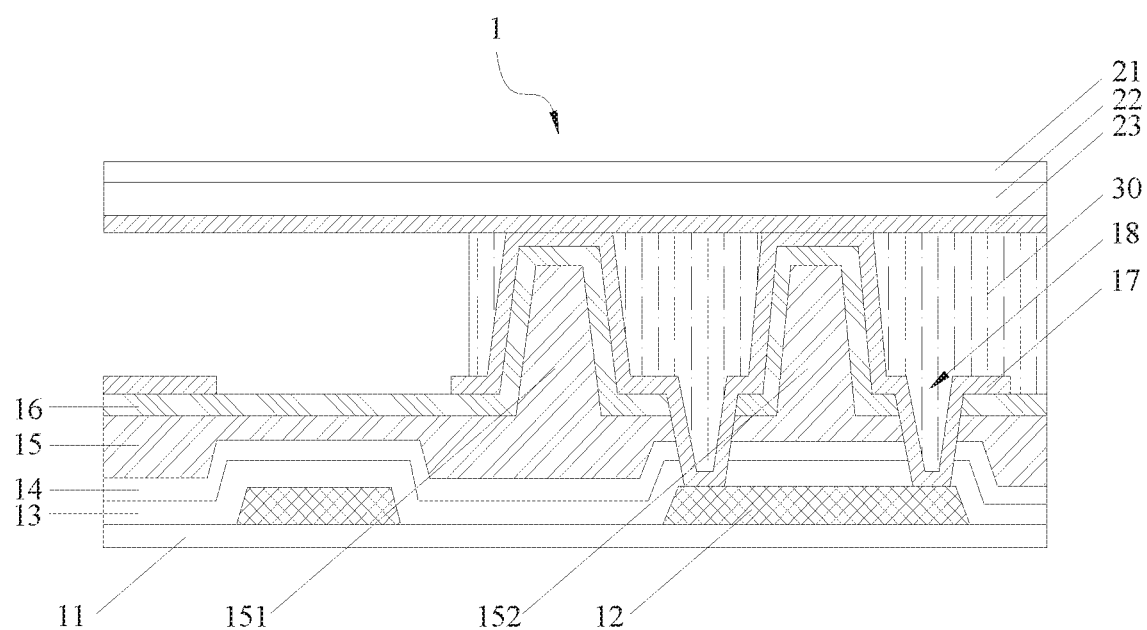
FIG. 2 is a schematic view of a cell assembly of a display panel provide by other embodiments of the present application.

Referring to FIG. 2, in embodiments of the cell assembly provided by the present application, a second support 152 protrudes from the color resist layer 15, the second support 152 is located in the contact hole 18, and the second support 152 and the first passivation layer 16 together form a second support assembly. The second support assembly is in surface contact with the second substrate 20, and the first conductive layer 17 further covers the second support assembly. Particularly, a surface of a side of the first support assembly close to the second substrate 20 is located on the same level as a surface of a side of the second support assembly close to the second substrate 20, that is, the second support assembly and the first support assembly have the same height of the protrusions and both the second support assembly and the first support assembly function in supporting the second substrate 20 together, so that the second support assembly can effectively reduce the step difference between a region within the contact hole 18 and a region outside the contact hole 18. Even the display panel 1 after the cell process is pressed, the uniformity of the cell thickness can be ensured. It can be understood that a base of the second support assembly is formed by stacking the color resist layer 15, the second passivation layer 14, and the insulation layer 13, and the second support assembly and the first support assembly can be formed in the same process, thus no additional process is required, and the production cost of the whole cell process will not be increased.

Referring to FIG. 2, in the embodiment of the cell assembly provided by the present application, an outer contour of the first support 151 and an outer contour of the second support 152 are post-like, such that, on the one hand, the post-like first support 151 and the second support 152 have relatively large volume, which enables the first support 151 and the second support 152 to be easily formed on the color resist layer 15, and on the other hand, each of the post-like first support 151 and second support 152 is respectively in surface contact with the color resist layer 15 and the second substrate 20, which has enlarged effective contact area, when compared with adopting the silicon ball to be in contact with the first passivation layer 16 and the second substrate 20, and therefore improves the stability and the firmness of the support.

Referring to FIG. 2, in the embodiment of the cell assembly provided by the present application, the first support 151, the second support 152, and the color resist layer 15 are formed as a whole. Particularly, the first support 151 and the second support 152 are formed during the formation of the color resist layer 15. The color resist layer 15 includes a red color block, a blue color block, and a green color block. The respective first support 151 and second support 152 may be integrally formed together with the red color block, or the blue color block, or the green color block, that is, each of the first support 151 and the second support 152 is able to form an integral structure with the red color block, or the blue color block, or the green color block. Or alternatively, the respective first support 151 and second support 152 is formed by stacking the red color block and the blue color block, or by stacking the red color block and the green color block, or by stacking the blue color block and the green color block, or by stacking the red color block, the blue color block, and the green color block. In this way, no additional process is required, and the production cost of the whole cell process will not increase.

Referring to FIG. 2, in embodiments of the cell assembly provided by the present application, the second substrate 20 includes a second substrate layer 21 and a second conductive layer 23. The second substrate layer 21 is a glass substrate, the second conductive layer 23 is arranged at the second substrate layer 21, and the second conductive layer 23 is connected to the metal wire 12 via the first conductive layer 17. Particularly, the second conductive layer 23 may be selected as an ITO film, and the second conductive layer 23 is configured to form the common electrode of the second substrate 20. By pushing the first conductive layer 17 to be in contact with the second conductive layer 23 by the first support assembly or the second support assembly, the voltage can be transmitted from the common electrode of the first substrate 10 to the second substrate 20 via the first conductive layer 17 and the second conductive layer 23

Referring to FIGS. 1-2, in embodiments of the cell assembly provided by the present application, the second substrate 20 includes a black shading layer 22. The black shading layer 22 is sandwiched between the second substrate layer 21 and the second conductive layer 23 and is configured to block the light from a light leakage area. Particularly, the black shading layer 22 is a black photoresist layer made of a carbon black material; and gaps between orthographic projections of the red color block, the blue color block, and the green color block onto the first substrate layer 11 are covered by an orthographic projection of the black shading layer 22 onto the first substrate layer 11, thereby effectively blocking light passing through the gap between the red color block, the blue color block, and the green color block, preventing the display panel 1 from light leakage, and improving the yield of the display panel 1.

Referring to FIGS. 1-2, the present application further provides a display panel including the cell assembly as described in the above.

The display panel 1 provided by the present application adopts the cell assembly. The first support 151 is arranged on the color resist layer 15, the first support 151 and the first passivation layer 16 covering the surface of the first support 151 together form the first support assembly, the second substrate 20 is supported by the first substrate 10 via the first support assembly, and the first support assembly is in surface contact with the second substrate 20. Compared with the use of the silicon ball and the gold ball independent of the first substrate to support the second substrate, the present construction is much stable and has better support effect, which can more accurately control the thickness of the peripheral region of the cell, such that technical problem of ununiformity of the thickness of the cell at the periphery is effectively tackled, and the yield of the display panel 1 is improved.

Figure 3:
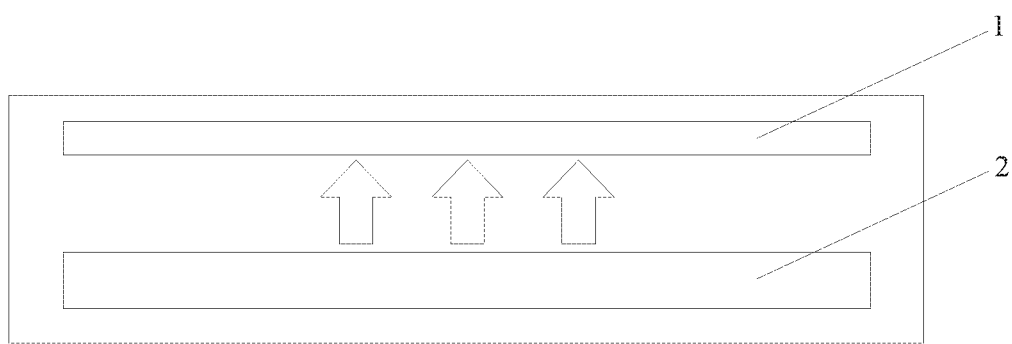
FIG. 3 is a structural schematic view of a display device provided by some embodiments of the present application.

Referring to FIG. 3, the present application also provides a display device including the above display panel 1 and the backlight assembly 2. The backlight assembly 2 is configured to illuminate the display panel 1.

The display panel 1 provided by the present application adopts the display panel 1. The first support 151 is arranged on the color resist layer 15, the first support 151 and the first passivation layer 16 covering the surface of the first support 151 together form the first support assembly, the second substrate 20 is supported by the first substrate 10 via the first support assembly, and the first support assembly is in surface contact with the second substrate 20. Compared with the use of the silicon ball and the gold ball independent of the first substrate to support the second substrate, the present construction is much stable and has better support effect, which can more accurately control the thickness of the peripheral region of the cell, such that technical problem of ununiformity of the thickness of the cell at the periphery is effectively tackled, and the yield of the display panel 1 is improved, and the production cost of the display device is reduced.

The above description is only optional embodiments of the present application, and is not intended to limit the present application. Any modifications, equivalent substitutions, and improvements made within the spirit and principles of the present application are included in the protection scope of the present application.

What is claimed is:

1. A cell assembly, comprising:
   a first substrate; and
   a second substrate, arranged opposite to and spaced apart from the first substrate;
   wherein, the first substrate comprises:
   a color resist layer, provided with a first support protruding therefrom; and
   a first passivation layer, covering the color resist layer, wherein the first passivation layer and the first support together form a first support assembly, and the first support assembly is in surface contact with the second substrate;
   a sealant, filled in a gap between the first substrate and the second substrate;
   wherein the first support assembly is arranged within a coating area of the sealant;
   wherein a surface of the first support assembly is covered with a first conductive layer;
   a second support protruding from the color resist layer; and
   wherein the first support, the second support, and the color resist layer are thrilled as a whole;
   wherein the first substrate further comprises:
   a first substrate layer;
   a metal wire, arranged on a surface of the first substrate layer;
   an insulation layer, arranged on a surface of the metal wire and a surface of the first substrate layer exposed out of the metal wire; and
   a second passivation layer, arranged on a surface of the insulation layer and configured for connecting the color resist layer;
   wherein the first substrate defines therein a contact hole; the contact hole is arranged within the coating area of the sealant; the contact hole passes through the first passivation layer, the color resist layer, the insulation layer, and the second passivation layer and is configured to allow the first conductive layer to pass therethrough into electrical connection with the metal wire; and
   wherein the second support is located in the contact hole; the second support and the first passivation layer together form a second support assembly; the second support assembly is in surface contact with the second substrate; and the first conductive layer further covers the second support assembly.

2. The cell assembly of claim 1, wherein the sealant is applied to edges of the first substrate and the second substrate along a circumference direction.

3. The cell assembly of claim 1, wherein a surface of a side of the first support assembly close to the second substrate is located on the same level as a surface of a side of the second support assembly close to the second substrate.

4. The cell assembly of claim 3, wherein an outer contour of the first support and an outer contour of the second support are post-like.

5. The cell assembly of claim 1, wherein the color resist layer comprises a red color block, a blue color block, and a green color block.

6. The cell assembly of claim 5, wherein the respective first support and second support and one of the red color block, the blue color block, and the green color block are formed as a whole.

7. The cell assembly of claim 5, wherein the respective first support and second support is formed by stacking the red color block, the blue color block, and the green color block.

8. The cell assembly of claim 5, wherein the second substrate comprises:
   a second substrate layer; and
   a second conductive layer, arranged at the second substrate layer and connected to the metal wire via the first conductive layer.

9. The cell assembly of claim 8, wherein the second substrate further comprises:
   a black shading layer, sandwiched between the second substrate layer and the second conductive layer and configured to block the light from a light leakage area.

10. The cell assembly of claim 8, wherein the first conductive layer and the second conductive layer are flirts made of indium tin oxide.

11. A display panel, comprising a cell assembly, wherein the cell assembly comprises:
    a first substrate; and
    a second substrate, arranged opposite to and spaced apart from the first substrate; and
    a sealant, filled in a gap between the first substrate and the second substrate;
    the first substrate comprises:
    a first substrate layer;
    a metal wire, arranged on a surface of the first substrate layer;
    an insulation layer, arranged on a surface of the metal wire and a surface of the first substrate layer exposed out of the metal wire; and
    a second passivation layer, arranged on a surface of the insulation layer;
    a color resist layer, arranged on the second passivation layer, wherein a first support and a second support protrude from the color resist layer; and
    a first passivation layer, covering the color resist layer, wherein the first passivation layer and the first support together form a first support assembly, the second passivation layer and the second support together form a second support assembly, and the first support assembly and the second support assembly are in surface contact with the second substrate; and
    a first conductive layer, covering the first support assembly and the second support assembly;
    wherein the first substrate defines therein a contact hole; the contact hole is arranged within the coating area of the sealant; the contact hole passes through the first passivation layer, the color resist layer, the insulation layer, and the second passivation layer and is configured to allow the first conductive layer to pass therethough into electrical connection with the metal wire; and the first support is arranged at an edge outside the contact hole, and the second support is arranged inside the contact hole; and wherein the first support, the second support, and the color resist layer are formed as a whole.

12. The display panel of claim 11, wherein the first substrate is an array substrate provided with a color film, and the second substrate is a substrate provided with a common electrode.

* * * * *